UNITED STATES PATENT OFFICE.

FREDERICK GEORGE FRYER AND BASIL GORDON McLELLAN, OF YORK, ENGLAND.

MANUFACTURE OF HIGH-CLASS "FONDANT" CHOCOLATE AND SIMILAR CHOCOLATES.

1,387,377.      Specification of Letters Patent.      Patented Aug. 9, 1921.

No Drawing.      Application filed July 27, 1920. Serial No. 399,343.

*To all whom it may concern:*

Be it known that we, FREDERICK GEORGE FRYER and BASIL GORDON McLELLAN, subjects of the King of the United Kingdom of Great Britain and Ireland, residing at York, England, have invented certain new and useful Improvements in the Manufacture of High-Class "Fondant" Chocolate and Similar Chocolates, (for which I have filed an application in Great Britain, July 25, 1919) of which the following is a specification.

This invention relates to the manufacture of high class "fondant" chocolates and similar chocolates of the smooth variety.

Hitherto in the commonly adopted system of manufacture of this class of chocolate the partially ground cocoa liquor and sugar with or without other ingredients, such as flavoring materials and cocoa butter, after being mixed together and subsequently refined by being ground as many times as is deemed necessary in heavy grinding machines, such as refiners or broyeuses, for example, or in conical or disk mills, are subjected to a further lengthy treatment for many hours in conches or other machines with the object of developing the aroma of the chocolate and effecting other important changes by comparatively gentle agitation or by such agitation accompanied by heating.

Now the present invention consists in substituting for said lengthy treatment of the mixture in a conche or other slow-acting machine the subjection of the mixture to a liquefying operation effected, for instance, by means of a beater of any suitable form, such as a cream beater and then to extreme agitation or threshing for a few minutes. Preferably a regulated current of air is admitted or has access to the material during treatment by any suitable means. By means of this treatment the conching effect may be attained in much less time than hitherto and the heavy and expensive conches which absorb much power and floor space may be dispensed with.

A machine suitable for carrying out the extreme agitation or threshing above referred to is disclosed in the application of Frederick George Fryer, Serial No. 399,439, filed July 27, 1920.

What we claim is—

1. In the manufacture of high class "fondant" chocolate and similar chocolates of the smooth variety, mixing together materials comprising partially ground cocoa liquor and sugar, repeatedly grinding the mixture and subsequently subjecting it to a liquefying operation and then to extreme agitation for a few minutes.

2. In the manufacture of high class "fondant" chocolate and similar chocolates of the smooth variety as claimed in claim 1, admitting a current of air to the mixture while being agitated.

3. In the manufacture of high class "fondant" chocolate and similar chocolates of the smooth variety, a mixing and refining process including as final step extreme agitation of the mixture.

4. In the manufacture of high class "fondant" chocolate and similar chocolates of the smooth variety, a mixing and refining process including as final step beating the mixture and then subjecting it for a short time to extreme agitation.

In testimony whereof, we affix our signatures in the presence of two witnesses.

FREDERICK GEORGE FRYER.
BASIL GORDON McLELLAN.

Witnesses:
    ARNOLD S. NAMBEE,
    OSCAR F. RUMTREE.